United States Patent [19]

Nakasima et al.

[11] Patent Number: 4,951,134

[45] Date of Patent: Aug. 21, 1990

[54] COLOR TONE CONTROLLER FOR ENDOSCOPE

[75] Inventors: Masaaki Nakasima; Tadashi Takahashi, both of Tokyo, Japan

[73] Assignee: Asahi Kogaku Kogyo Kabushiki Kaisha, Tokyo, Japan

[21] Appl. No.: 192,926

[22] Filed: May 12, 1988

[30] Foreign Application Priority Data

May 18, 1987 [JP] Japan ................... 62-122334

[51] Int. Cl.$^5$ .......................... H04N 9/64; A61B 1/04
[52] U.S. Cl. ...................................... 358/98; 358/28; 358/29
[58] Field of Search ................ 358/98, 27, 28, 29, 358/10, 22; 128/6; 340/706

[56] References Cited

U.S. PATENT DOCUMENTS

| | | | |
|---|---|---|---|
| 4,593,313 | 6/1986 | Nagasaki et al. | 358/98 |
| 4,654,701 | 3/1987 | Yabe | 358/98 |
| 4,768,089 | 8/1988 | Kato | 358/98 |
| 4,796,019 | 1/1989 | Auerbach | 340/706 X |

Primary Examiner—Howard W. Britton
Assistant Examiner—Victor R. Kostak
Attorney, Agent, or Firm—Sandler, Greenblum & Bernstein

[57] ABSTRACT

A color tone controller for an endoscope which has a converting device, for example, a solid-state image sensor, for converting an observed image into an electric signal which is delivered to a monitor device where an observed image is reproduced. The color tone of the image reproduced by the monitor device is controllable with a color tone control device. The contents of the color tone control are quantitatively displayed on the screen of the monitor device in the form of numerals by way of example.

18 Claims, 3 Drawing Sheets

COLOR TONE CONTROLLER FOR ENDOSCOPE

BACKGROUND OF THE INVENTION

1. Field of the Invention

The present invention relates to a color tone controller for an endoscope designed to reproduce an observed image on a monitor screen by converting the image of an object of examination into an electric signal by the use of a solid-state image sensor or other similar means.

2. Description of the Related Art

Endoscopes of the type in which an observed image is reproduced on a monitor screen by converting the image of an object of examination into an electric signal have the advantage that it is possible to control the color tone of the reproduced image as desired. However, if the observer cannot grasp the degree (contents) of control of the color tone, he cannot judge the degree to which the balance of colors has been changed by the tone control. Accordingly, it is impossible to judge whether the color of the observed image displayed on the monitor screen represents the actual color of an object of examination or it has been artificially changed by the tone control, that is, the observer cannot make a judgment as to whether the color of the object is normal or not, so that it is impossible to make an accurate diagnosis. In particular, when a recorded image is reproduced later to make an examination, it is completely impossible to make a judgment of color.

Under these circumstances, it is conventional practice to display the degree (contents) of tone control on a monitor screen for each of the three primary colors by means, for example, of color bars which are displayed in these primary colors themselves.

The above-described conventional practice suffers, however, from the following disadvantages. Since the contents of tone control are displayed on the monitor screen by means of relevant colors themselves, it is impossible to grasp specifically and quantitatively the degree to which the color tone has been controlled although it can be judged qualitatively by the sense of vision. Accordingly, the contents of tone control can be estimated only roughly by visual judgment, and it is therefore impossible to make an accurate diagnosis.

SUMMARY OF THE INVENTION

An object of the present invention is to provide a color tone controller for an endoscope which enables the contents of tone control to be grasped quantitatively so that it is possible to make an accurate diagnosis from a reproduced image displayed on the monitor screen.

Other objects and advantages of the present invention will become apparent from the following detailed description of an illustrated embodiment of the invention.

According to the present invention, there is provided a color tone controller for an endoscope having a converting device for converting an observed image into an electric signal and a monitor device for reproducing an observed image on the basis of the electric signal input thereto, the controller comprising: a color tone control device for controlling the color tone of the image reproduced by the monitor device; and a color tone display device for quantitatively displaying on the monitor device the contents of color tone control effected with the color tone control device.

BRIEF DESCRIPTION OF THE INVENTION

The present invention may be more fully understood from the description of a preferred embodiment of the invention set forth below, together with the accompanying drawings, in which.

DESCRIPTION OF THE EMBODIMENT

Figure 1:
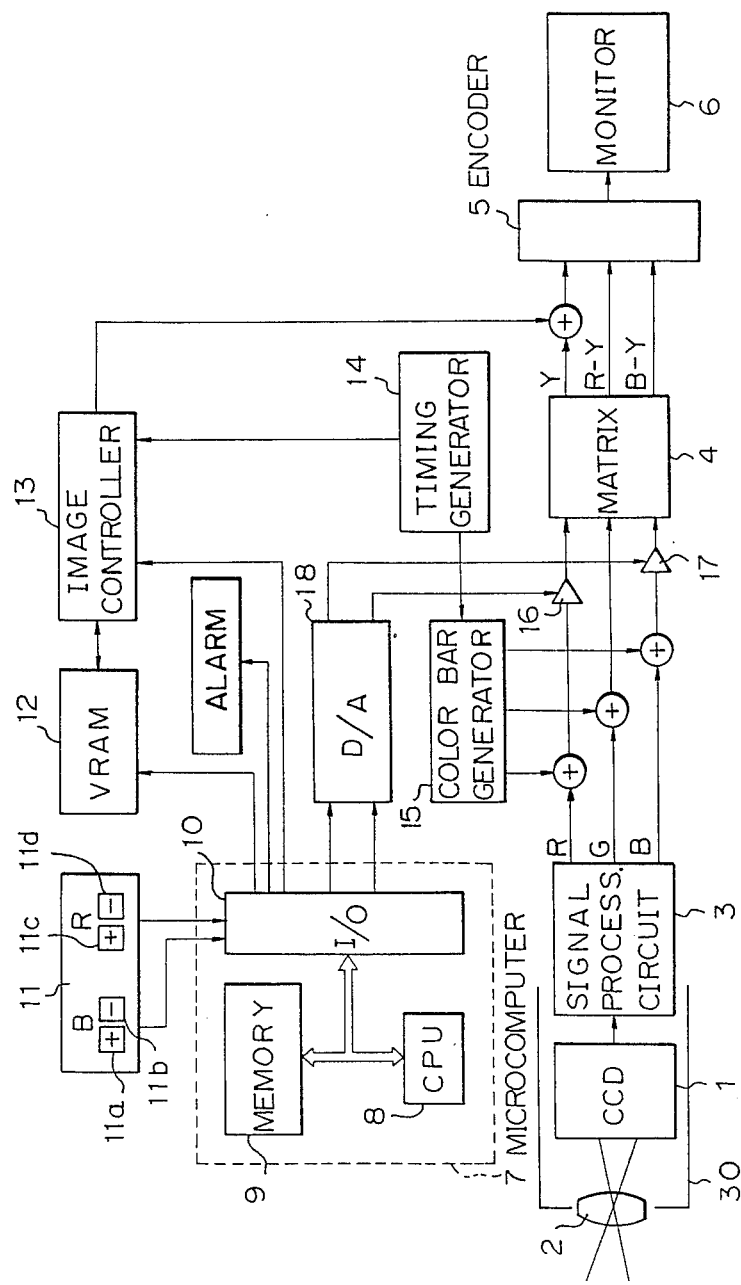
FIG. 1 is a block diagram showing the arrangement of one embodiment of the present invention.

FIG. 1 shows the arrangement of one embodiment of the present invention. The reference numeral 1 denotes a solid-state image sensor which is defined by, for example, a CCD (Charge-Coupled Device), the image sensor 1 being disposed at the imagery position of an objective lens 2 which is incorporated in the distal end portion of an insert part 30 of an endoscope. A signal processing circuit 3 is connected to the output end of the CCD 1 to separate the input signal from the CCD 1 to signals for the three primary colors, that is, red (R), green (G) and blue (B), and output these signals. The reference numeral 4 denotes a matrix circuit which generates color difference signals R-Y and B-Y and a luminance signal Y on the basis of the three signals R, G and B output from the signal processing circuit 3 such that the signals thus generated are taken out through an encoder 5 which is connected to the output end of the matrix circuit 4. A monitor 6 is connected to the output end of the encoder 5, the monitor 6 being arranged such that a color image is displayed on a cathode-ray tube for color display by way of example.

A microcomputer 7 comprises a central processing unit (CPU) 8, a memory 9 and an input/output interface 10. An input switch 11 for tone control is connected to the input end of the interface 10. The input switch 11 is provided with four push-button switches 11a, 11b, 11c and 11d for increasing (+) or decreasing (−) the intensity of color components, for example, blue (B) and red (R). To the output end of the interface 10 are connected a video memory (VRAM) 12 and a known image controller 13 for controlling the preparation of a picture which is to be displayed on the monitor screen. The VRAM 12 and the image controller 13 are interconnected, and the output end of a timing generator 14 for generating predetermined pulses is connected to the image controller 13.

The VRAM 12 is arranged to record data at each of the addresses set so as to correspond to respective blocks of the monitor screen which are defined by dividing the screen into a multiplicity of minute blocks. More specifically, predetermined characters or the like are recorded in the VRAM 12 in correspondence with predetermined positions on the monitor screen. At addresses for displaying the contents of tone control, numerals employed to represent the contents are recorded, and these numerals are renewed in accordance with an output signal from the interface 10.

The output end of the image controller 13 is connected to a signal path between the matrix circuit 4 and the encoder 5 so that an output signal from the image controller 13 is added to the luminance signal Y. In this way, data recorded in the VRAM 12 is displayed at a predetermined position on the monitor screen under the control of the image controller 13.

The reference numeral 15 denotes a color bar generator which separates the three primary colors from each other and generates a color bar by which the separated color components are displayed side by side on the monitor screen. The color bar generator 15 adds at a predetermined timing a signal representing a reference intensity of light to each of the signals R, G and B output from the signal processing circuit 3 in synchronism with the output signal from the timing generator 14.

The reference numerals 16 and 17 denote color tone controlling amplifiers for changing the voltage levels of the red (R) and blue (B) signals. These amplifiers 16 and 17 are interposed between the signal processing circuit 3 and the matrix circuit 4. The control input ends of the amplifiers 16 and 17 are connected with the respective output ends of the interface 10 through a D/A converter 18 which converts digital signals into analog signals.

Figure 2:
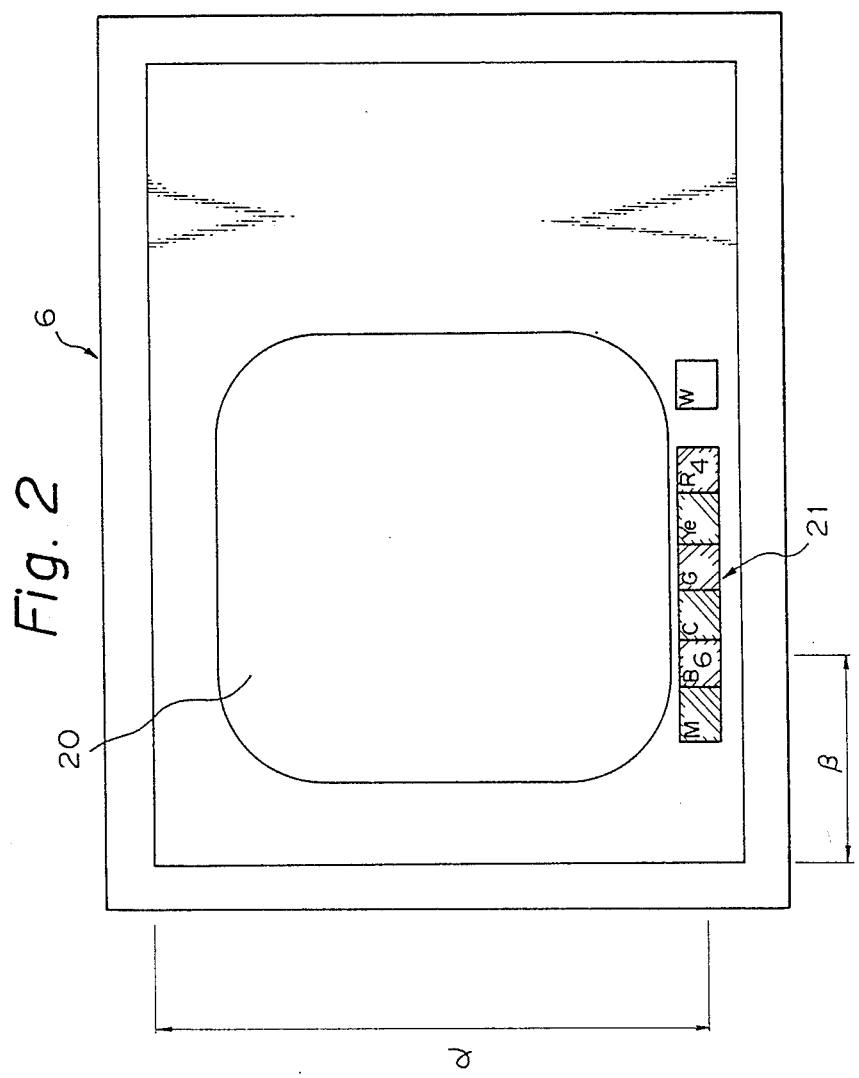
FIG. 2 is a front view schematically showing the screen of the monitor in the embodiment.

The operation of the above-described embodiment will next be explained with reference also to FIG. 2 which shows the screen of the monitor 6.

The image of an object of examination which is formed on the surface of the CCD 1 by the objective lens 2 of the endoscope is separated into three primary color signals R, G and B in the signal processing circuit 3, and these three signals are converted into color difference signals R-Y, B-Y and a luminance signal Y in the matrix circuit 4. The luminance signal Y and the color difference signals R-Y, B-Y are delivered to the encoder 5 and an image signal is output therefrom to the monitor 6. Thus, the image 20 of the object is reproduced on the screen of the monitor 6.

In response to the output signals from the color bar generator 15, the three primary colors are displayed at a predetermined position (below the object image 20 in the present invention) on the monitor screen in the form of a color bar 21 and in accordance with the level of the applied voltage for each color component. It should be noted that in this embodiment magenta (M), cyan (C) and yellow (Ye) are also displayed by the color bar 21. In the portions of the color bar 21 for blue (B) and red (R), the levels of voltages applied to these color components are displayed on the basis of the output signal from the image controller 13 in such a manner that a numeral recorded at a predetermined address in the VRAM 12 is superposed on each of the portions B and R (e.g., a white numeral may be placed on the colored background).

In this embodiment, the color tone is controllable within 10 levels, which are represented by the numerals 0 to 9, and the applied voltage changes in units of, for example, 1.3 times, for each level. Accordingly, assuming that the numeral displayed on the monitor screen is n, the intensity of the color component concerned is the nth power of 1.3. Further, the degree of white balance (W) is displayed in a color which is a mixture of red (R), green (G) and blue (B) at the right-hand side of the color bar 21 on the monitor screen.

To control the color tone, one of the push-button switches 11a, 11b, 11c and 11d of the input switch 11 for tone control is selected and pushed. In consequence, a signal is output from the interface 10 in accordance with the pushed switch 11a, 11b, 11c or 11d. The output signal is converted into an analog signal in the D/A converter 18 and then applied to the amplifier 16 or 17 for tone control, thus causing a change in the voltage of the signal R or B. In this embodiment, the color tone is controllable within 10 levels and the applied voltage changes in units of, for example, 1.3 times, for each level, as described above. Every time the push-button switch 11a, 11b, 11c or 11d is pushed, the applied voltage for the designated color changes by one level.

This change in the applied voltage causes changes in the colors of the color bar 21 and the white balance (W) on the monitor screen. At the same time, the numeral representing the intensity of the color concerned (R or G) recorded in the VRAM 12 is renewed on the basis of an output signal from the interface 10, and a signal representing the new numeral is output from the image controller 13 and displayed at a predetermined position on the monitor screen.

It should be noted that, when the condition of tone control has already reached the upper or lower limit of the controllable range, any operation of the push-button switch concerned causes no change in the applied voltage nor change in the display on the monitor screen but an alarm to be sounded.

Figure 4:
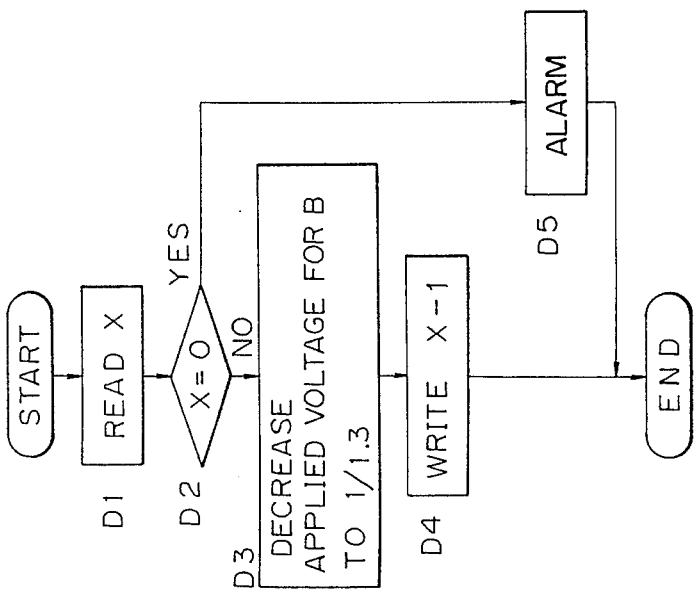
FIGS. 3 and 4 are flowcharts showing programs used to operate the microcomputer in the embodiment.
Figure 3:
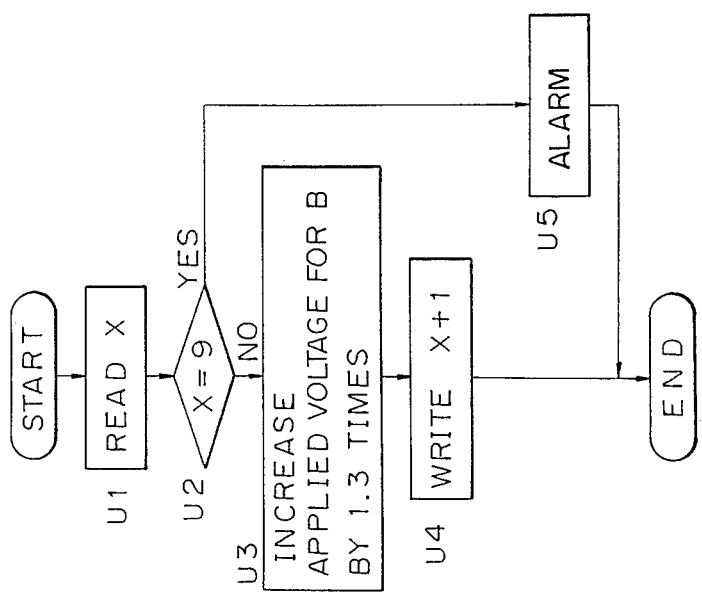

FIGS. 3 and 4 are flowcharts showing programs stored in the memory 9 incorporated in the microcomputer 7. FIG. 3 shows a program which is run when the push button switch 11a for increasing the intensity of blue, i.e., B(+), is pushed, while FIG. 4 shows a program which is run when the push-button switch 11b for decreasing the intensity of blue, i.e., B(−), is pushed. The reference symbols U1 to U5 and D1 to D5 denote Steps in the flowcharts.

The control process that is executed when the operator desires to increase the intensity of blue will first be explained with reference to FIG. 3. When the button switch 11a is pushed, data X stored at a predetermined address ($\alpha$, $\beta$) in the VRAM 12 is read in Step U1, and it is judged in Step U2 whether or not X is the maximum value, i.e., 9, in the controllable range. If NO, that is, if X is not equal to 9, a signal by which the voltage of the signal for blue (B) is increased by 1.3 times is output in Step U3, and X+1 is written at the address ($\alpha$, $\beta$) in the VRAM 12 in Step U4, thus completing the control process. If X=9, an alarm is sounded in Step U5, and the process is then ended.

The control process shown in FIG. 4 which is executed when the intensity of blue is desired to be decreased may be explained in the same way as in the case of the increase in the blue color intensity. Therefore, illustration of the flowchart will suffice. It should be noted that the control process for increasing or decreasing the intensity of red (R) is, although not shown, conducted in the same way as in the case of blue (B) except that the address in the VRAM 12 is different from that described above.

According to the present invention, the contents of tone control are quantitatively displayed on the monitor screen, and it is therefore possible to grasp precisely the degree of tone control effected on an observed image reproduced on the monitor screen and hence make an accurate diagnosis. When a recorded image is reproduced later to make an examination, it is also possible to understand accurately the degree to which the color tone of the image has been controlled. Accordingly, the present invention provides considerably advantageous effects.

While the invention has been described by reference to a specific embodiment chosen for purpose of illustration, it should be apparent that numerous modifications could be made thereto by those skilled in the art without departing from the basic concept and scope of the invention.

What is claimed is:

1. A color tone controller for an endoscope having converting means for converting an observed image into an electric signal and monitor means for reproducing an observed image on the basis of said electric signal input thereto, said controller comprising:
   color tone control means for selectively controlling the color tone of the image reproduced by said monitor means independently of the image reproduced by said monitor means, said color tone control means effecting color tone control by changing the intensities of at least two color components among the three primary colors; and
   color tone display means for quantitatively displaying on said monitor means the contents of color tone control effected with said tone control means, wherein said color tone display means digitally displays on said monitor means the intensities of the color components which are changeable in the form of numerals.

2. A color tone controller for an endoscope according to claim 1, wherein said converting means is a solid-state image sensor.

3. A color tone controller for an endoscope according to claim 2, wherein said solid-state image sensor is a CCD.

4. A color tone controller for an endoscope according to claim 1, wherein said converting means is incorporated in the distal end portion of the insert part of said endoscope.

5. A color tone controller for an endoscope according to claim 1, wherein said monitor means is a CRT for color display.

6. A color tone controller for an endoscope according to claim 1, wherein said color tone display means has color display means arranged to separate the three primary colors from each other and display the separated colors side by side on said monitor means, said numerals being superposed on the respective colors displayed by said color display means.

7. A color tone controller for an endoscope according to claim 1, and further comprising manually actuated switches for selectively controlling the color tone of the image reproduced on said monitor means.

8. A color tone controller for an endoscope according to claim 7, wherein said manually actuated switches are push switches.

9. A color tone controller for an endoscope according to claim 1, wherein said color tone control means includes at least one of an upper and lower limit.

10. A color tone controller for an endoscope according to claim 9, wherein said color tone means includes both an upper and lower limit.

11. A color tone controller for an endoscope according to claim 9, and further comprising an alarm for warning of said limit.

12. A color tone controller for an endoscope according to claim 1, wherein said color tone display means displays the degree of white balance corresponding to the color tone.

13. A color tone controller for an endoscope according to claim 1, wherein said color tone display means includes color display means arranged to separate the three primary colors from each other and display the separated colors side by side on said monitor means, said color tone display means displaying the degree of white balance corresponding to the color tone separately from the display of the three primary colors.

14. A color tone controller for an endoscope having converging means for converting an observed image into an electric signal and monitor means for reproducing an observed image on the basis of said electric signal input thereto, said controller comprising:
   color tone control means for selectively controlling the color tone of the image reproduced by said monitor means independently of the image reproduced by said monitor means, said color tone control means including at least one of an upper and lower limit;
   an alarm for warning of said limit; and
   color tone display means for quantitatively displaying on said monitor means the contents of color tone control effected with said color tone control means.

15. A color tone controller for an endoscope according to claim 14, wherein said color tone control means includes both an upper and lower limit.

16. A color tone controller for an endoscope having converting means for converting an observed image into an electric signal and monitor means for reproducing an observed image on the basis of said electric signal input thereto, said controller comprising:
   color tone control means for selectively controlling the color tone of the image reproduced by said monitor means independently of the image reproduced by said monitor means; and
   color tone display means for quantitatively displaying on said monitor means the contents of color tone control effected with said color tone control means, said color display means displaying the intensities of color components which are changeable on the monitor means in the form of numerals.

17. A color tone controller for an endoscope according to claim 16, wherein said color tone control means effects color tone control by changing the intensities of at least two color components among the three primary colors.

18. A color tone controller for an endoscope according to claim 17, wherein said color tone display means digitally displays on said monitor means the intensities of the color components which are changeable.

* * * * *